(12) United States Patent
Mayer

(10) Patent No.: US 11,819,031 B2
(45) Date of Patent: Nov. 21, 2023

(54) COMPOSITION COMPRISING GLUTEN-FREE FLOUR AND HYDROXYPROPYL METHYL CELLULOSE

(71) Applicant: Dow Global Technologies LLC, Midland, MI (US)

(72) Inventor: Franz Mayer, Bomlitz (DE)

(73) Assignee: Nutrition & Biosciences USA 1, LLC, Rochester, NY (US)

( * ) Notice: Subject to any disclaimer, the term of this patent is extended or adjusted under 35 U.S.C. 154(b) by 826 days.

(21) Appl. No.: 16/064,043

(22) PCT Filed: Jan. 13, 2017

(86) PCT No.: PCT/US2017/013472
§ 371 (c)(1),
(2) Date: Jun. 20, 2018

(87) PCT Pub. No.: WO2017/131973
PCT Pub. Date: Aug. 3, 2017

(65) Prior Publication Data
US 2019/0008169 A1     Jan. 10, 2019

Related U.S. Application Data

(60) Provisional application No. 62/418,327, filed on Nov. 7, 2016, provisional application No. 62/358,640, filed on Jul. 6, 2016, provisional application No. 62/287,025, filed on Jan. 26, 2016.

(51) Int. Cl.
| | |
|---|---|
| *A23L 33/24* | (2016.01) |
| *A21D 13/04* | (2017.01) |
| *A21D 13/066* | (2017.01) |
| *A21D 2/18* | (2006.01) |
| *C08L 1/28* | (2006.01) |
| *A23L 33/00* | (2016.01) |
| *A21D 13/043* | (2017.01) |
| *A21D 13/047* | (2017.01) |
| *A21D 13/045* | (2017.01) |
| *A23L 7/109* | (2016.01) |
| *A21D 10/00* | (2006.01) |

(52) U.S. Cl.
CPC .......... *A21D 13/066* (2013.01); *A21D 2/188* (2013.01); *A21D 10/002* (2013.01); *A21D 10/005* (2013.01); *A21D 13/04* (2013.01); *A21D 13/043* (2017.01); *A21D 13/045* (2017.01); *A21D 13/047* (2017.01); *A23L 7/109* (2016.08); *A23L 33/24* (2016.08); *A23L 33/40* (2016.08); *C08L 1/284* (2013.01); *A23V 2002/00* (2013.01); *A23V 2200/304* (2013.01); *C08L 2205/025* (2013.01); *C08L 2205/035* (2013.01)

(58) Field of Classification Search
CPC ....... A21D 13/066; A21D 2/186; A21D 2/266
See application file for complete search history.

(56) References Cited

U.S. PATENT DOCUMENTS

| | | | | |
|---|---|---|---|---|
| 4,778,684 A | * | 10/1988 | D'Amico | A21D 10/04 426/291 |
| 5,194,271 A | * | 3/1993 | Yasosky | A21D 6/005 426/243 |
| 2005/0175756 A1 | | 8/2005 | Fukasawa | |
| 2006/0088647 A1 | | 4/2006 | Kadan | |
| 2007/0031564 A1 | * | 2/2007 | Fontanesi | A23L 29/212 426/557 |
| 2008/0038934 A1 | | 2/2008 | Vrtis et al. | |
| 2010/0291272 A1 | | 11/2010 | Steffens et al. | |
| 2011/0117246 A1 | | 5/2011 | Clement | |
| 2012/0207880 A1 | * | 8/2012 | Shin | A21D 13/04 426/61 |
| 2013/0129864 A1 | * | 5/2013 | Brandt | A21D 2/186 426/62 |
| 2013/0245249 A1 | | 9/2013 | Itoh et al. | |
| 2013/0323355 A1 | * | 12/2013 | Zhang | A21D 2/188 426/2 |

FOREIGN PATENT DOCUMENTS

| | | |
|---|---|---|
| EP | 1561380 | 3/2007 |
| EP | 2153724 | 11/2010 |

(Continued)

OTHER PUBLICATIONS

Sosolski. "Functional Properties of Rapeseed Flours, Concentrates and Isolate" Journal of Food Science vol. 41 1976. http://onlinelibrary.wiley.com/doi/10.1111/j.1365-2621.1976.tb01168.x/pdf.*
Crocket et al., How Do Xanthan and Hydroxypropyl Methylcellulose Individually Affect the Physicochemical Properties in a Model Gluten-Free Dough?, Journal of Food Science, vol. 76, nr. 3, 2011, E274-E282.
Schober, Manufacture of Gluten-Free Specialty Breads and Confectionery Products, Gluten-Free Food Science and Technology, Edited by Eimear Gallagher, 2009.
Dow, Baking Science into Success, Pharma & Food Solutions, 2015, pp. 1-12, XP055353867.
Gallagher et al., Recent advances in the formulation of gluten-free cereal-based products, Trends in Food Science & Technology, 15, 2004, pp. 143-152.

*Primary Examiner* — Lien T Tran

(57) ABSTRACT

A composition useful for making bread of high quality comprises a) a gluten-free flour, b) a hydroxypropyl methylcellulose having a methoxyl content of from 19 to 24 percent and a hydroxypropoxyl content of from 4 to 12 percent, each being based on the total weight of the hydroxypropyl methylcellulose, and c) a hydroxypropyl methylcellulose having a methoxyl content of from 27 to 30 percent and a hydroxypropoxyl content of from 4 to 12 percent, each being based on the total weight the hydroxypropyl methylcellulose, wherein the composition comprises from 10 to 90 weight percent of the hydroxypropyl methylcellulose b) and from 90 to 10 weight percent of the hydroxypropyl methylcellulose c), based on the total weight of b) and c).

16 Claims, No Drawings

(56) References Cited

FOREIGN PATENT DOCUMENTS

EP 2401920 1/2012
WO 2010053579 A1 5/2010

* cited by examiner

COMPOSITION COMPRISING GLUTEN-FREE FLOUR AND HYDROXYPROPYL METHYL CELLULOSE

FIELD

This invention relates to a composition comprising gluten-free flour, to gluten-free food products, such as gluten-free bakery products or gluten-free pasta, and to a method of managing a gluten-related disorder in an individual.

INTRODUCTION

Gluten is a protein complex found in Triticeae tribe of grains, which includes wheat, barley and rye. The gluten content in wheat flour provides desirable organoleptic properties, such as texture and taste, to innumerable bakery and other food products. Gluten also provides the processing qualities to both the commercial food manufacturer as well as the home baker. In general, it is very difficult to make bread using gluten-free flours such as rice flour and buckwheat flour. When dough is fermented with yeast, in the case of dough using wheat flour or rye flour containing gluten, the carbon dioxide gas generated by fermentation is retained by the gluten so that the gluten network is extended and the dough rises. In the case of dough using gluten-free flour, the carbon dioxide gas generated by fermentation is not retained within the dough so that the dough does not efficiently rise. Gluten is considered by many to be the "heart and soul" of bakery and other food products.

However, gluten has its drawbacks. The gluten protein complex, upon entering the digestive tract, breaks down into peptide chains like other protein sources, but the resulting gluten-related peptide chain length is longer than for other proteins. For this and other reasons, in some people, these longer peptides trigger an immune response commonly referred to as celiac disease. Celiac disease is characterized by inflammation, villous atrophy and cryptic hyperplasia in the intestine. The mucosa of the proximal small intestine is damaged by an immune response to gluten peptides that are resistant to digestive enzymes. This damage interferes with the body's ability to absorb vital nutrients such as proteins, carbohydrates, fat, vitamins, minerals, and in some cases, even water and bile salts. If left untreated, celiac disease increases the risk of other disorders, such as anemia, osteoporosis, short stature, infertility and neurological problems, and has been associated with increased rates of cancer and other autoimmune disorders. Accordingly, much research has been spent on finding gluten-free food products.

The use of hydroxypropyl methyl cellulose in dough composition comprising gluten-free flour is well known. For example, its use is described in European Patent Application Nos. EP 1 561 380 and EP 2 153 724, US patent application publication Nos. 2006/0088647, 2008/0038434 and US 2010/0291272 and by E. Gallagher et al. in *Trends in Food Science & Technology* 15 (2004) pp. 143-152.

US patent application publication No. 2005/0175756 discloses a dough composition comprising gluten-free flour, a water-soluble cellulose ether, and a low substituted cellulose ether having a total molar substitution of 0.05-1.0. The water-soluble cellulose ether is methyl cellulose (MC) containing 10-40 wt. % of methoxyl groups or hydroxypropyl methyl cellulose (HPMC) or hydroxyethyl methyl cellulose (HEMC) containing 10-40 wt % of methoxyl groups and 3-30 wt. % of hydroxyalkyl groups. The low substituted cellulose ether is not soluble in water but in alkaline solution. The water-soluble cellulose ether and the low substituted cellulose ether should preferably have an average particle size of up to 100 μm. The bread made from the dough composition is said to have a good mouthfeel and a satisfactory volume and retains softness over time. Unfortunately, the patent application is silent on staling of the bread crumb over an extended time period of several days.

The incorporation of HPMC into gluten-free dough compositions indeed provides many advantages and hence has been studied in depth by the skilled artisans. In the article "*How Do Xanthan and Hydroxypropyl Methyl Cellulose Individually Affect the Physiochemical Properties in a Model Gluten-Free Dough?*", 2011, Journal of Food Science 76(3), Crockett et al. describe the individual effects of two hydroxypropyl methyl celluloses (HPMCs) and xanthan gum that were added individually at 2%, 3%, and 5% to rice cassava dough without the addition of alternative proteins. One studied HPMC was METHOCEL© E15 having 28-30% methoxyl substitution and 7-12% hydroxypropyl substitution and a viscosity of 15 cp; it was designated as high methoxyl HPMC. The other studied HPMC was METHOCEL © 4KM having 19-24% methoxyl substitution and 7-12% hydroxypropyl substitution and a viscosity of 4000 cp; it was designated as low methoxyl HPMC. In the bread, the final specific loaf volume increased with high methoxyl HPMC (2% to 5%) and low methoxyl HPMC (2%) but was depressed with increased addition of low methoxyl HPMC (5%) and xanthan (3% and 5%). Crumb hardness was decreased in high methoxyl HPMC loaves but was increased significantly in low methoxyl HPMC (5%) and xanthan (5%) formulations. From the gums studied, it was concluded that high methoxyl HPMC was the optimum hydrocolloid in the rice cassava gluten-free dough.

Although the specific volume of bread loaves produced from gluten-free dough compositions can be significantly increased by incorporation of high methoxyl HPMC, it is still highly desirable to provide compositions which comprise gluten-free flour and which enable the production of bread loaves of further increased specific volume. One way of further increasing the specific volume of bread loaves is to optimize the other properties of the high methoxyl HPMC, such as hydroxypropoxyl substitution or viscosity, but in this case the further increased specific volume is achieved at the costs of the appearance of the bread loaves. The bread loaves do not keep their shape well after cooling but display shrunk sides of the bread loaves. Hence, it would be desirable to provide compositions which comprise gluten-free flour and which enable the production of bread loaves which have further increased specific volume and which keep their shape well after cooling.

It is also known that quick staling—or increase in crumb firmness—upon storage of gluten-free bread for days is one of the most unpleasant properties of gluten-free bread (Tilman J. Schober, *Manufacture of gluten-free specialty breads and confectionary products*, Chapter 9.3.8 in: Eimear Gallagher (ed.), Gluten-free food science and technology; Wiley-Blackwell 2009, p.130ff). It would be even more desirable to provide compositions which comprise gluten-free flour and which enable the production of bread loaves which have a further increased specific volume, which keep their shape well after cooling and which have a bread crumb of low firmness, initially and/or upon storage.

SUMMARY

One aspect of the present invention is a composition which comprises a) a gluten-free flour, b) a hydroxypropyl methylcellulose having a methoxyl content of from 19 to 24 percent and a hydroxypropoxyl content of from 4 to 12 percent, each being based on the total weight of the hydroxypropyl methylcellulose, and c) a hydroxypropyl methylcellulose having a methoxyl content of from 27 to 30 percent and a hydroxypropoxyl content of from 4 to 12 percent, each being based on the total weight the hydroxypropyl methylcellulose, wherein the composition comprises from 10 to 90 weight percent of the hydroxypropyl methylcellulose b) and from 90 to 10 weight percent of the hydroxypropyl methylcellulose c), based on the total weight of b) and c).

Another aspect of the present invention is a food product comprising or made from the above-mentioned composition.

Yet another aspect of the present invention is a method of managing a gluten-related disorder in an individual, which comprises providing the above-mentioned food product to the individual.

It has surprisingly been found that the composition of the present invention which comprises from 10 to 90 weight percent of the hydroxypropyl methylcellulose b) and from 90 to 10 weight percent of the hydroxypropyl methylcellulose c), based on the total weight of b) and c), is useful for producing food products, such as bakery products, and in particular bread, which have a high specific volume, keep their shape well after cooling and have bread crumb of low firmness after storage.

DESCRIPTION OF EMBODIMENTS

One aspect of the present invention is a composition which comprises gluten-free flour. The term "gluten-free flour" as used herein is a powder made by grinding cereal grains or other seeds, roots (like cassava) or other parts of gluten-free plants. The term "a gluten-free flour" or "the gluten-free flour" is not limited to flour from a single source but also encompasses a mixture of flours of difference sources. The term "gluten-free flour" as used herein also encompasses starches in powder form extracted from gluten-free plants, such as tapioca starch or potato starch. This means that the composition itself and food products comprising or produced from the composition typically are also gluten-free. A typical method of making gluten-free food products consists of using only ingredients derived from gluten-free starting materials, rather than using flour derived from a gluten-containing grain, such as wheat. Accordingly, the composition of the present invention comprises a) a gluten-free flour, such as: amaranth flour, arrowroot flour, rice flour, buckwheat flour, corn flour, polenta flour, sweet potato flour, lentil flour, grape seed flour, garbanzo bean flour, garfava flour (a flour produced by Authentic Foods which is made from a combination of garbanzo beans and fava beans), millet flour, oat flour, potato flour, quinoa flour, Romano bean flour, sorghum flour, soy flour, sweet rice flour, tapioca flour, psyllium husk powder, powder produced from bamboo fibers or teff flour or a combination of two or more such flours. Preferred are tapioca starch, rice flour, maize flour, potato starch, power produced from bamboo fibers and psyllium husk powder. Preferably the composition of the present invention comprises at least three, more preferably at least four, even more preferably at least five gluten-free flours selected from the group consisting of tapioca starch, rice flour, maize flour, potato starch, power produced from bamboo fibers and psyllium husk powder. Most preferably, the composition of the present invention comprises all six of these listed gluten-free flours.

The flour is preferably used in an amount of from 50 to 98 percent, more preferably from 65 to 90 percent, based on the total dry weight of the composition.

Furthermore, the composition of the present invention comprises b) a hydroxypropyl methylcellulose (HPMC) which has a content of methoxyl groups of from 19 to 24 percent and a content of hydroxypropoxyl groups of from 4 to 12 percent, preferably from 7 to 12 percent, each being based on the total weight of the hydroxypropyl methylcellulose b). The viscosity of the hydroxypropyl methylcellulose b) generally is at least 50 mPa·s, preferably at least 300 mPa·s, more preferably at least 2000 mPa·s, and most preferably at least 3000 mPa·s, determined in a 2% by weight solution in water at 20° C. The viscosity of the HPMC b) generally is up to 200,000 mPa·s, preferably up to 100,000 mPa·s, and more preferably up to 20,000 mPa·s or up to 5000 mPa·s, determined in a 2% by weight solution in water at 20° C.

Furthermore, the composition of the present invention comprises c) a hydroxypropyl methylcellulose (HPMC) which has a content of methoxyl groups of from 27 to 30 percent and a content of hydroxypropoxyl groups of from 4 to 12 percent, each being based on the total weight the hydroxypropyl methylcellulose c). In one aspect of the present invention, the HPMC c) preferably has a content of methoxyl groups from 28 to 30 percent and a content of hydroxypropoxyl groups from 7 to 12 percent. In another aspect of the present invention the HPMC c) preferably has a content of methoxyl groups from 27 to 30 percent and content of hydroxypropoxyl groups from 4 to 7.5 percent.

The viscosity of the HPMC c) generally is at least 2.4 mPa·s, preferably at least 3 mPa·s, more preferably at least 5 mPa·s, and most preferably at least 10 mPa·s, determined in a 2% by weight solution in water at 20° C. The viscosity of the HPMC c) generally is up to 10,000 mPa·s, preferably up to 1000 mPa·s, preferably up to 500 mPa·s, more preferably up to 100 mPa·s, and most preferably up to 50 mPa·s or even up to 20 mPa·s, determined in a 2% by weight solution in water at 20° C. A HPMC c) having a content of methoxyl groups from 28 to 30 percent and a content of hydroxypropoxyl groups from 7 to 12 percent most preferably has a viscosity of from 5 mPa·s to 50 mPa·s, and in particular from 10 mPa·s to 20 mPa·s, determined in a 2% by weight solution in water at 20° C. A HPMC c) having a methoxyl content of from 27 to 30 percent and a hydroxypropoxyl content of from 4 to 7.5 percent most preferably has a viscosity of from 10 to 100 mPa·s, and in particular from 40 mPa·s to 60 mPa·s, determined in a 2% by weight solution in water at 20° C.

The content of methoxyl groups and of hydroxypropoxyl groups in the HPMCs b) and c) are determined as described for "Hypromellose", United States Pharmacopeia and National Formulary, USP 35, pp 3467-3469. The viscosities of the HPMCs b) and c) are determined as a 2% by weight solution in water at 20° C. as described in the United States Pharmacopeia (USP 35, "Hypromellose", pages 423-424 and 3467-3469). As described in the United States Pharmacopeia, viscosities of less than 600 mPa·s are determined by Ubbelohde viscosity measurement and viscosities of 600 mPa·s or more are determined using a Brookfield viscometer. Descriptions on preparing the 2 wt. % HPMC solution and both Ubbelohde and Brookfield viscosity measurement conditions are disclosed in the United States Pharmacopeia (USP 35, "Hypromellose", pages 423-424 and 3467-3469 and in ASTM D-445 and ISO 3105 referenced therein).

The composition of the present invention comprises from 10 weight percent, preferably from 15 weight percent, more preferably from 20 weight percent, even more preferably from 30 weight percent and most preferably from 35 weight percent, and up to 90 weight percent, preferably up to 85 weight percent, more preferably up to 80 weight percent, even more preferably up to 70 weight percent and most preferably up to 60 weight percent of the HPMC b), based on the total weight of b) and c). The composition of the present invention also comprises from 10 weight percent, preferably from 15 weight percent, more preferably from 20 weight percent, even more preferably from 30 weight percent, and most preferably from 40 weight percent, and up to 90 weight percent, preferably up to 85 percent, more preferably up to 80 weight percent, even more preferably up to 70 weight percent and most preferably up to 65 weight percent of the HPMC c), based on the total weight of b) and c).

The total amount of HPMCs b) and c) is preferably at least 1.0 parts, more preferably at least 1.5 parts, and most preferably at least 2.0 part by weight, based on 100 parts by weight of the gluten-free flour(s). The total amount of HPMCs b) and c) is preferably used in an amount of up to 7.0 parts, more preferably up to 5.0 parts and most preferably up to 4.0 parts by weight, based on 100 parts by weight of the gluten-free flour(s).

The inventors of the present patent application have surprisingly found that the composition of the present invention comprising two HPMCs in the weight ratio of 10-90 percent HPMC b) and 90-10 percent HPMC c), preferably in the weight ratio of 20-80 percent HPMC b) and 80-20 percent HPMC c), each based on the total weight of b) and c), is useful for producing food products, such as bakery products, and in particular bread, which have a higher specific volume and crumb of lower firmness than food products produced from comparable compositions which comprise the same total amount of HPMC, but which only comprise HPMC b) (HPMC having 19-24% methoxyl and 4-12% hydroxypropoxyl). Surprisingly, the inventors of the present patent application have also found that the composition of the present invention comprising two HPMCs in the weight ratio of 10-90 percent HPMC b) and 90-10 percent HPMC c), preferably in the weight ratio of 20-80 percent HPMC b) and 80-20 percent HPMC c), and more preferably in the weight ratio of 20-60 percent HPMC b) and 80-40 percent HPMC c) are useful for producing food products, such as bakery products, and in particular bread, which have a comparable or in some embodiments even a higher specific volume, which have comparable firmness and which have a much more stable shape after cooling and storing, as compared to food products produced from comparable compositions which comprise the same total amount of HPMC, but which only comprise HPMC c) (HPMC having 27-30% methoxyl and 4-12% hydroxypropoxyl). By the term "crumb of lower firmness" is meant crumb of reduced initial firmness and/or a reduced rate of firmness increase over storage time. The shape stability after cooling can be visually assessed. E.g., the Example Section below shows that bread produced from Comparative Examples comprising only HPMC c) have shrunk sides of the bread loaves upon cooling, whereas bread loaves produced from the Examples of the present invention do not display this deficiency.

The composition of the present invention may comprise one or more optional additional ingredients, in addition to components a), b), and c). Preferably not more than 55 parts, more preferably not more than 45 parts by weight of optional ingredients other than water are incorporated in the composition of the present invention, based on 100 parts by weight of the gluten-free flour. Water can be added to the composition at a higher amount, as described further below.

The composition of the present invention may comprise a carboxymethyl cellulose as an optional additional ingredient. If a carboxymethyl cellulose is used, it is generally used in an amount of from 0.5 to 5.0 parts, preferably from 1.0 to 4.0 parts, more preferably from 1.5 to 2.5 parts by weight based on 100 parts by weight of the gluten-free flour(s). The term "carboxymethyl cellulose" or "CMC" as used herein encompasses cellulose substituted with groups of the formula —$CH_2CO_2A$, wherein A is hydrogen or a monovalent cation, such as $K^+$ or preferably $Na^+$. Preferably the carboxymethyl cellulose is in the form of its sodium salt, i.e., A is $Na^+$. Typically, the carboxymethyl cellulose has a degree of substitution of from 0.20 to 0.95, preferably from 0.40 to 0.95, and more preferably from 0.65 to 0.95. The degree of substitution is the average number of OH groups that have been substituted in one anhydroglucose unit. It is determined according to ASTM D 1439-03 "Standard Test Methods for Sodium Carboxymethylcellulose; Degree of Etherification, Test Method B: Nonaqueous Titration". The treatment of a solid sample of the CMC with glacial acetic acid at boiling temperature releases an acetate ion quantity equivalent to the sodium carboxymethyl groups. These acetate ions can be titrated as a strong base in anhydrous acetic acid using a perchloric acid standard solution. The titration end point is determined potentiometrically. Other alkaline salts of carboxylic acids (e. g. sodium glycolate and di-sodium diglycolate) behave similarly and are co-titrated. The viscosity of the carboxymethyl cellulose generally is from 20 to 20,000 mPa·s, preferably from 25 to 12,000 mPa·s, more preferably from 100 to 5,000 mPa·s, and most preferably from 500 to 4000 mPa·s, determined in a 1% by weight solution in water at 20° C., using a Brookfield LVT viscosimeter, spindle No. 3, at 30 rpm.

Examples of other optional ingredients in gluten-free compositions and food products, besides components a), b), and c), are as follows: gums, including xanthan gum and guar gum; gelatin; eggs, such as egg white; egg replacers; sweeteners, including sugars, molasses, and honey; salt; yeast; chemical leavening agents, including baking powder and baking soda; fats, including margarine and butter; oils, including vegetable oil; vinegar, dough enhancer, dairy products, including milk, powdered milk, and yogurt; soy milk; nut ingredients, including almond meal, nut milk, and nut meats; seeds, including flaxseed, poppy seeds, and sesame seeds; fruit and vegetable ingredients, including fruit puree and fruit juice; and flavorings, including vanilla, cocoa powder, and cinnamon. However, this is not a comprehensive list of all ingredients that can be used to make gluten-free food products, such as gluten-free bakery products.

Water may be incorporated in the composition of the invention, for example, when dough or batter, such as bread dough, is prepared. It is generally added in an amount of from 50 to 250 parts by weight, preferably from 65 to 200 parts by weight, more preferably from 80 to 170 parts by weight, based on 100 parts by weight of the gluten-free flour.

The composition of the present invention is useful for preparing gluten-free food products, such as gluten-free bakery products, like breads, muffins, cakes, cookies or pizza crusts; gluten-free pasta, cereal products, crackers, and bar products. The composition of the present invention can be processed to the gluten-free food product in a conventional manner, for example by producing a dough or a batter from the composition of the present invention, subjecting it to molding or casting, optionally leavening the composition, and optionally baking it, depending on the kind of food product to be produced.

The food products of the present invention are an excellent replacement of traditional gluten-containing food products, such as food products containing wheat flour. Accordingly, providing the food product of the present invention to an individual suffering from a gluten-related disorder is an effective method of managing a gluten-related disorder in the individual.

The following examples are for illustrative purposes only and are not intended to limit the scope of the present invention.

EXAMPLES

Unless otherwise mentioned, all parts and percentages are by weight. In the Examples the following test procedures are used.

Firmness of Bread Crumb

The firmness measured 1 day after baking is designated as "initial firmness". The firmness measured later than 1 day after baking is called firmness over storage time and is a measure for determining shelf life. In the time period between i) baking and cooling and ii) the firmness measurement the bread loaves are stored in polyethylene bags. A low initial firmness and/or a low firmness over storage time are desirable.

For texture analysis, a modified version of AACC method 74-09 (American Association of Cereal Chemists) was applied. Firmness of wheat bread and gluten-free bread was measured with a texture analyzer TA.XT plus (Stable Microsystems Ltd., Godalming, Surrey, UK) using the following settings:

Sample preparation: bread slices of 25 mm thickness freshly cut from the center of loaves;
5 kg load cell;
Round probe diameter 40 mm;
Speed 1 mm/s.

The firmness is defined as force needed to press the probe 6.25 mm (25% of the slice's thickness) into the bread crumb.

Examples 1-4 and Comparative Examples A and B

Dough is prepared from the ingredients as listed in Tables 1 and 2 below. The hydroxypropyl methylcellulose (HPMC) b) has a methoxyl content of from 19 to 24 percent, a hydroxypropoxyl content of from 7 to 12 percent and a viscosity of 3000 to 5000 mPa·s, determined in a 2% by weight solution in water at 20° C. The HPMC b) is commercially available from The Dow Chemical Company as METHOCEL™ K4M cellulose ether; it is abbreviated as "K4M" in Table 2 below. The HPMC c) has a methoxyl content of from 28 to 30 percent, a hydroxypropoxyl content of from 7 to 12 percent and a viscosity of about 19 mPa·s, determined in a 2% by weight solution it water at 20° C. The HPMC c) is commercially available from The Dow Chemical Company as METHOCEL™ E19 cellulose ether, it is abbreviated as "E19" in Table 2 below.

For preparing the dough, all the dry ingredients are weighted into a container and mixed well. The liquid ingredients are added into the dry ingredients under high shear. The dough is kneaded for 6 min and then transferred to a greased loaf pan for proofing at 32° C. and 80% relative humidity for one hour and 15 min. After that, it is baked at 210° C. for 50 min. The specific volume of the bread is analyzed after cooling the bread and storing for 24 hours in a polyethylene bag.

TABLE 1

Dough Recipe for Gluten-free Bread

| | Weight parts |
|---|---|
| Gluten-free flour and HPMC | |
| Tapioca starch | 10.66 |
| Rice flour | 9.13 |
| Powder produced from bamboo fibers | 5.71 |
| Potato starch | 3.43 |
| Psyllium husk powder | 3.04 |
| Maize flour | 2.28 |
| Total weight of HPMC, as listed in Table 2 | 1.00 |
| Additional Ingredients | |
| Water | 51.21 |
| Egg white powder | 4.19 |
| Sunflower oil | 3.81 |
| Sugar | 2.28 |
| Compressed fresh yeast | 1.91 |
| Salt (NaCl) | 1.15 |
| Coated sorbic acid | 0.20 |
| Sum | 100 |

TABLE 2

| (Comparative) Example | HPMC, wt.-% based on dough recipe | Specific Volume (cm3/g) | Relative Specific Volume, relative to Comp. Ex. A |
|---|---|---|---|
| A | 1.0% K4M + 0.0% E19 | 3.19 | 100% |
| 1 | 0.8% K4M + 0.2% E19 | 3.80 | 119% |
| 2 | 0.6% K4M + 0.4% E19 | 3.99 | 125% |
| 3 | 0.4% K4M + 0.6% E19 | 4.07 | 128% |
| 4 | 0.2% K4M + 0.8% E19 | 3.82 | 120% |
| B | 0.0% K4M + 1.0% E19 | 3.47 | 109% |

The results in Table 2 above illustrate that in some aspects of the invention gluten-free bread prepared from a dough comprising two HPMCs in the weight ratio of 10-90 percent HPMC b) and 90-10 percent HPMC c), preferably 20-80 percent HPMC b) and 80-20 percent HPMC c), each based on the total weight of b) and c), has a higher specific volume than bread produced from comparable dough which comprises the same total amount of HPMC, but which only comprises HPMC b) or only HPMC c). Moreover, the breads of Examples 1 to 4 have fine pores without any unduly large holes, are well sliceable and keep their shape well on cooling.

Example 5 and Comparative Examples C-E

The recipe for preparing dough of Example 5 and of Comparative Example C is listed in Table 3 below. The sodium carboxymethyl cellulose listed in Table 3 below has a degree of substitution of 0.9 and a viscosity of 3000 to 4000 mPa·s, determined in a 1% by weight solution in water at 20° C., using a Brookfield LVT viscosimeter, spindle No. 3, at 30 rpm.

TABLE 3

Dough Recipe for Gluten-free Bread

| | Example 5 Weight parts | Comp. Ex. C Weight parts |
|---|---|---|
| Gluten-free flour and HPMC | | |
| Tapioca starch | 10.59 | 10.59 |
| Rice flour | 9.07 | 9.07 |
| Powder produced from bamboo fibers | 5.67 | 5.67 |
| Potato starch | 3.40 | 3.40 |
| Psyllium husk powder | 3.02 | 3.02 |
| Maize flour | 2.27 | 2.27 |
| HPMC | 0.60 K4M + 0.40 E19 | 1.00 K4M |
| Additional Ingredients | | |
| Water | 50.87 | 50.87 |
| Egg white powder | 4.16 | 4.16 |
| Sunflower oil | 3.78 | 3.78 |
| Sugar | 2.27 | 2.27 |
| Compressed fresh yeast | 1.90 | 1.90 |
| Salt (NaCl) | 1.14 | 1.14 |
| Sodium carboxymethyl cellulose (WALOCEL™ CRT 30000PA) | 0.67 | 0.67 |
| Coated sorbic acid | 0.20 | 0.20 |
| Sum | 100 | 100 |

The recipe for preparing dough of Comparative Examples D and E is listed in Table 4 below.

TABLE 4

Wheat bread recipe

| Ingredients | Comparative Example D Weight parts | Comparative Example E Weight parts |
|---|---|---|
| Wheat flour Type 550 | 100.0 | 100.0 |
| Water | 58.0 | 58.0 |
| Compressed fresh yeast | 4.50 | 4.50 |
| Salt | 2.00 | 2.00 |
| Sunflower oil | 1.00 | 1.00 |
| Amylase Fungamyl 2500 | 0.005 | 0.005 |
| Xylanase Panzea | 0.003 | 0.003 |
| Lipase Lipopan F | 0.003 | 0.003 |
| Antistaling enzyme: Maltogenic amylase Novamyl 10000 | — | 0.020 |
| Ascorbic acid | 0.010 | 0.010 |
| Coated sorbic acid | 0.20 | 0.20 |
| Sum | 165.721 | 165.741 |

Equal weights of dough are prepared from the recipes of Example 5 and Comparative Examples C, D and E as described above in Examples 1-4, except that the proofing time of the dough in Example 5 is 75 min. and the proofing times in Comparative Examples C, D and E are adjusted to produce breads of Example 5 and Comparative Examples C, D and E that all have comparable volume. After that the pieces of dough are baked as described above.

The firmness of bread crumb of gluten-free bread of Example 5 is compared with the firmness of bread crumb of gluten-free bread of Comparative Example C and with the firmness of bread crumb of wheat bread of Comparative Examples D and E. The firmness of the bread crumb is measured as described above and listed in Table 5.

TABLE 5

| Firmness of bread crumb (g/N) | Initial (1 day after baking) | 7 day after baking | 14 day after baking |
|---|---|---|---|
| Example 5 | 571 g/5.6 N | 783 g/7.7 N | 866 g/8.5 N |
| Comp. Ex. C | 688 g/6.7 N | 977 g/9.6 N | 1164 g/11.4 N |
| Comp. Ex. D | 600 g/5.9 N | 1260 g/12.4 N | 1624 g/15.9 N |
| Comp. Ex. E | 585 g/5.7 N | 895 g/8.8 N | 1371 g/13.4 N |

The results in Table 5 above illustrate that gluten-free bread prepared from dough of the present invention has much less tendency to staling—or increase in crumb firmness—upon storage of the bread than the breads produced from the Comparative Examples C, D and E.

Examples 6-13 and Comparative Examples F-I

Dough is prepared from the ingredients as listed in Tables 6-8 below. The hydroxypropyl methylcellulose (HPMC) b) is the same as the one utilized in Examples 1-4 and Comparative Examples A and B above and is commercially available from The Dow Chemical Company as METHOCEL™ K4M cellulose ether, it is abbreviated as "K4M" in Tables 7 and 8 below. The HPMC c) has a methoxyl content of from 27 to 30 percent, a hydroxypropoxyl content of from 4 to 7.5 percent and a viscosity of about 50 mPa·s, determined in a 2% by weight solution it water at 20° C. The HPMC c) is commercially available from The Dow Chemical Company as METHOCEL™ F50 cellulose ether, it is abbreviated as "F50" in Tables 7 and 8 below.

For preparing the dough, all the dry ingredients are weighted into a container and mixed well. The liquid ingredients are added into the dry ingredients under high shear. The dough is kneaded for 6 min and then transferred to a greased loaf pan for proofing at 32° C. and 80% relative humidity for one hour and 15 min. After that, it is baked at 210° C. for 50 min. The specific volume of the bread is analyzed after cooling the bread and storing for 24 hours in a polyethylene bag.

TABLE 6

Dough Recipe for Gluten-free Bread

| | Recipe A Weight parts | Recipe B Weight parts |
|---|---|---|
| Gluten-free flour and HPMC | | |
| Tapioca starch | 10.61 | 10.61 |
| Rice flour | 9.09 | 9.09 |
| Powder produced from bamboo fibers | 5.68 | 5.68 |
| Potato starch | 3.41 | 3.41 |
| Psyllium husk powder | 3.03 | 3.03 |
| Maize flour | 2.27 | 2.27 |
| Total weight of HPMC, as listed in Table 7 | 1.00 | 1.00 |
| Additional Ingredients | | |
| Water | 50.97 | 50.97 |
| Egg white powder | 4.17 | 4.17 |
| Sunflower oil | 3.79 | 3.79 |
| Sugar | 2.27 | 2.27 |
| Compressed fresh yeast | 1.90 | 1.90 |

TABLE 6-continued

Dough Recipe for Gluten-free Bread

| | Recipe A Weight parts | Recipe B Weight parts |
|---|---|---|
| Salt (NaCl) | 1.14 | 1.14 |
| Sodium carboxymethyl cellulose (WALOCEL ™ CRT 30000PA) | 0.67 | — |
| Sum | 100 | 99.33 |

TABLE 7

| (Comparative) Example | HPMC, wt.-% based on dough recipe A | Specific Volume (cm3/g) | Relative Specific Volume, relative to Comp. Ex. F |
|---|---|---|---|
| F | 1.0% K4M + 0.0% F50 | 3.24 | 100% |
| 6 | 0.8% K4M + 0.2% F50 | 3.50 | 108 |
| 7 | 0.6% K4M + 0.4% F50 | 3.80 | 117 |
| 8 | 0.4% K4M + 0.6% F50 | 4.02 | 124 |
| 9 | 0.2% K4M + 0.8% F50 | 4.07 | 126 |
| G | 0.0% K4M + 1.0% F50 | 4.19 | 129 |

TABLE 8

| (Comparative) Example | HPMC, wt.-% based on dough recipe B | Specific Volume (cm3/g) | Relative Specific Volume, relative to Comp. Ex. H |
|---|---|---|---|
| H | 1.0% K4M + 0.0% F50 | 3.07 | 100% |
| 10 | 0.8% K4M + 0.2% F50 | 3.50 | 114 |
| 11 | 0.6% K4M + 0.4% F50 | 3.81 | 124 |
| 12 | 0.4% K4M + 0.6% F50 | 4.02 | 131 |
| 13 | 0.2% K4M + 0.8% F50 | 4.23 | 138 |
| I | 0.0% K4M + 1.0% F50 | 4.28 | 139 |

The results in Tables 7 and 8 above illustrate that gluten-free bread prepared from a dough comprising two HPMCs in the weight ratio of 10-90 percent HPMC b) and 90-10 percent HPMC c), preferably 20-80 percent HPMC b) and 80-20 percent HPMC c), each based on the total weight of b) and c), has a higher specific volume than bread produced from comparable dough which comprises the same total amount of HPMC, but which only comprises HPMC b), such as K4M. Moreover, the breads of Examples 6 to 13 have fine pores without any unduly large holes, are well sliceable, do not display shrunk sides of the bread loaves and keep their shape well after cooling. Hence, breads prepared from dough of the present invention provide an optimum combination of high specific volume and good visual properties, such as a regular shape of the bread loaves.

Gluten-free breads prepared from dough of Comparative Examples G and I have slightly higher specific volumes than gluten-free breads prepared from dough of Examples 6 to 13. However, the breads prepared from the dough of Comparative Examples G and I display shrunk sides of the bread loaves upon cooling, which is not acceptable to consumers.

The firmness of bread crumb of the gluten-free breads of Examples 6-13 and Comparative Examples F-I are measured as described above and listed in Tables 9 and 10 below.

TABLE 9

| | | Firmness of bread crumb (g/N) | | |
|---|---|---|---|---|
| (Comp.) Example | HPMC, wt.-% based on dough recipe A | Initial (1 day after baking) | 7 day after baking | 14 day after baking |
| F | 1.0% K4M + 0.0% F50 | 811 g/8.0 N | 1149 g/11.2 N | 1724 g/16.9 N |
| 6 | 0.8% K4M + 0.2% F50 | 672 g/6.6 N | 1017 g/10.0 N | 1213 g/11.9 N |
| 7 | 0.6% K4M + 0.4% F50 | 529 g/5.2 N | 830 g/8.1 N | 925 g/9.1 N |
| 8 | 0.4% K4M + 0.6% F50 | 406 g/4.0 N | 600 g/5.9 N | 797 g/7.8 N |
| 9 | 0.2% K4M + 0.8% F50 | 392 g/3.8 N | 568 g/5.6 N | 746 g/7.3 N |
| G | 0.0% K4M + 1.0% F50 | 396 g/3.9 N | 544 g/5.3 N | 945 g/9.3 N |

TABLE 10

| | | Firmness of bread crumb | | |
|---|---|---|---|---|
| (Comp.) Example | HPMC, wt.-% based on dough recipe B | Initial (1 day after baking) | 7 day after baking | 14 day after baking |
| H | 1.0% K4M + 0.0% F50 | 923 g/9.1 N | 1145 g/11.2 N | 1669 g/16.4 N |
| 10 | 0.8% K4M + 0.2% F50 | 671 g/6.6 N | 667 g/6.5 N | 1161 g/11.4 N |
| 11 | 0.6% K4M + 0.4% F50 | 459 g/4.5 N | 548 g/5.4 N | 659 g/6.5 N |
| 12 | 0.4% K4M + 0.6% F50 | 394 g/3.9 N | 531 g/5.2 N | 685 g/6.7 N |
| 13 | 0.2% K4M + 0.8% F50 | 342 g/3.4 N | 453 g/4.4 N | 612 g/6.0 N |
| I | 0.0% K4M + 1.0% F50 | 334 g/3.3 N | 447 g/4.4 N | 491 g/4.8 N |

The comparisons i) between Comparative Examples F and G on the one hand and Examples 6-9 on the other hand, and ii) between Comparative Examples H and I on the one hand and Examples 10-13 on the other hand illustrate that gluten-free bread prepared from dough of the present invention comprising HPMCs b) and c) in combination has much less tendency to staling, i.e., increase in crumb firmness, than could be expected based the increase in crumb firmness of bread prepared from dough that only comprises HPMC b) or only HPMC c). The inclusion of 20-80 wt. % of HPMC c), and particularly 40-60 wt. % of HPMC c), based on the total weight of HPMC, displays a lower initial crumb firmness and a much lower increase in crumb firmness than could be expected based on the percentage of HPMC c) and based on the initial crumb firmness and the increase in crumb firmness of bread prepared from dough that only comprises HPMC b).

The results in Table 9 above illustrate that the firmness of bread crumb of the gluten-free bread of Examples 7 and 8 at 14 days after baking is even lower than the firmness of bread crumb of the gluten-free bread of Comparative Example F only one day after baking.

The results in Table 10 above illustrate that the firmness of bread crumb of the gluten-free bread of Examples 11 and 12 at 14 days after baking is also even lower than the firmness of bread crumb of the gluten-free bread of Comparative Example H only one day after baking.

Examples 14-21 and Comparative Examples J-M

Dough is prepared from the ingredients as listed in Table 6 above and in Tables 11 and 12 below. The hydroxypropyl methylcellulose (HPMC) b) has a methoxyl content of from 19 to 24 percent, a hydroxypropoxyl content of from 7 to 12 percent and a viscosity of about 12,000 mPa·s, determined in a 2% by weight solution in water at 20° C. The HPMC b) is commercially available from The Dow Chemical Company as METHOCEL™ K15M cellulose ether; it is abbreviated as "K15M" in Table 11 below.

The HPMC c) is the same as the one utilized in Examples 1-4 and Comparative Examples A and B above and is commercially available from The Dow Chemical Company as METHOCEL™ E19 cellulose ether; it is abbreviated as "E19" in Tables 11 and 12 below.

TABLE 11

| (Comparative) Example | HPMC, wt.-% based on dough recipe A | Specific Volume (cm3/g) | Relative Specific Volume, relative to Comp. Ex. J |
|---|---|---|---|
| J | 1.0% K15M + 0.0% E19 | 3.27 | 100% |
| 14 | 0.8% K15M + 0.2% E19 | 3.38 | 103 |

TABLE 11-continued

| (Comparative) Example | HPMC, wt.-% based on dough recipe A | Specific Volume (cm3/g) | Relative Specific Volume, relative to Comp. Ex. J |
|---|---|---|---|
| 15 | 0.6% K15M + 0.4% E19 | 3.54 | 108 |
| 16 | 0.4% K15M + 0.6% E19 | 3.81 | 116 |
| 17 | 0.2% K15M + 0.8% E19 | 3.82 | 117 |
| K | 0.0% K15M + 1.0% E19 | 3.47 | 106 |

TABLE 12

| (Comparative) Example | HPMC, wt.-% based on dough recipe A | Specific Volume (cm3/g) | Relative Specific Volume, relative to Comp. Ex. L |
|---|---|---|---|
| L | 1.0% K15M + 0.0% E19 | 2.88 | 100% |
| 18 | 0.8% K15M + 0.2% E19 | 3.31 | 115% |
| 19 | 0.6% K15M + 0.4% E19 | 3.51 | 122% |
| 20 | 0.4% K15M + 0.6% E19 | 3.87 | 134% |
| 21 | 0.2% K15M + 0.8% E19 | 3.63 | 126% |
| M | 0.0% K15M + 1.0% E19 | 3.14 | 109% |

The results in Tables 11 and 12 above illustrate that gluten-free bread prepared from a dough comprising two HPMCs in the weight ratio of 10-90 percent HPMC b) and 90-10 percent HPMC c), preferably 20-80 percent HPMC b) and 80-20 percent HPMC c), each based on the total weight of b) and c), has a higher specific volume than bread produced from comparable dough which comprises the same total amount of HPMC, but which only comprises HPMC b), such as K15M. In the preferred embodiments of the invention, gluten-free bread prepared from a dough comprising HPMCs b) and c) in the above-mentioned weight ratios also has a higher specific volume than bread produced from comparable dough which comprises the same total amount of HPMC, but which only comprises HPMC c), such as E19.

Moreover, the breads of Examples 14 to 21 have fine pores without any unduly large holes, are well sliceable, do not display shrunk sides of the bread loaves and keep their shape well after cooling. Hence, breads prepared from dough of the present invention provide an optimum combination of high specific volume and good visual properties, such as a regular shape of the bread loaves.

The firmness of bread crumb of the gluten-free breads of Examples 14-21 and Comparative Examples J-M are measured as described above and listed in Tables 13 and 14 below.

TABLE 13

| | | Firmness of bread crumb (g/N) | | |
|---|---|---|---|---|
| (Comp.) Example | HPMC, wt.-% based on dough recipe A | Initial (1 day after baking) | 7 day after baking | 14 day after baking |
| J | 1.0% K15M + 0.0% E19 | 1142 g/11.2 N | 1547 g/15.2_N | 2339 g/22.9 N |
| 14 | 0.8% K15M + 0.2% E19 | 1105 g/10.8 N | 1210 g/11.9 N | 1607 g/15.8 N |
| 15 | 0.6% K15M + 0.4% E19 | 615 g/6.0 N | 835 g/8.2 N | 1031 g/10.1 N |
| 16 | 0.4% K15M + 0.6% E19 | 547 g/5.4 N | 841 g/8.2 N | 956 g/9.4 N |
| 17 | 0.2% K15M + 0.8% E19 | 528 g/5.2 N | 652 g/6.4 N | 649 g/6.4 N |
| K | 0.0% K15M + 1.0% E19 | 528 g/5.2 N | 857 g/8.4 N | 1021 g/10.0 N |

TABLE 14

| (Comp.) Example | HPMC, wt.-% based on dough recipe B | Firmness of bread crumb | | |
|---|---|---|---|---|
| | | Initial (1 day after baking) | 7 day after baking | 14 day after baking |
| L | 1.0% K15M + 0.0% E19 | 1226 g/12.0 N | 1994 g/19.6 N | 2418 g/23.7 N |
| 18 | 0.8% K15M + 0.2% E19 | 946 g/9.3 N | 1250 g/12.3 N | 1226 g/12.0 N |
| 19 | 0.6% K15M + 0.4% E19 | 614 g/6.0 N | 719 g/7.1 N | 1033 g/10.1 N |
| 20 | 0.4% K15M + 0.6% E19 | 435 g/4.3 N | 557 g/5.5 N | 658 g/6.5 N |
| 21 | 0.2% K15M + 0.8% E19 | 546 g/5.4 N | 716 g/7.0 N | 828 g/8.1 N |
| M | 0.0% K15M + 1.0% E19 | 742 g/7.3 N | 1240 g/12.2 N | 1268 g/12.4 N |

The comparisons i) between Comparative Examples J and K on the one hand and Examples 14-17 on the other hand, and ii) between Comparative Examples L and M on the one hand and Examples 18-21 on the other hand illustrate that gluten-free bread prepared from dough of the present invention comprising HPMCs b) and c) in combination has much less tendency to staling, i.e., increase in crumb firmness, than could be expected based the increase in crumb firmness of bread prepared from dough that only comprises HPMC b) or only HPMC c).

The invention claimed is:

1. A composition comprising
a) a gluten-free flour,
b) a hydroxypropyl methylcellulose having a methoxyl content of from 19 to 24 percent and a hydroxypropoxyl content of from 4 to 12 percent, each being based on the total weight of the hydroxypropyl methylcellulose, and
c) a hydroxypropyl methylcellulose having a methoxyl content of from 27 to 30 percent and a hydroxypropoxyl content of from 4 to 12 percent, each being based on the total weight the hydroxypropyl methylcellulose,
wherein the composition comprises from 10 to 90 weight percent of the hydroxypropyl methylcellulose b) and from 90 to 10 weight percent of the hydroxypropyl methylcellulose c), based on the total weight of b) and c).

2. The composition of claim 1 comprising from 20 to 60 weight percent of the hydroxypropyl methylcellulose b) and from 80 to 40 weight percent of the hydroxypropyl methylcellulose c), based on the total weight of b) and c).

3. The composition of claim 1 wherein the hydroxypropyl methylcellulose c) has a methoxyl content of from 28 to 30 percent and a hydroxypropoxyl content of from 7 to 12 percent.

4. The composition of claim 1 wherein the hydroxypropyl methylcellulose c) has a methoxyl content of from 27 to 30 percent and a hydroxypropoxyl content of from 4 to 7.5 percent.

5. The composition of claim 1 wherein the hydroxypropyl methylcellulose b) has a viscosity of 1000 to 20,000 mPa·s, determined in a 2% by weight solution in water at 20° C.

6. The composition of claim 1 wherein the hydroxypropyl methylcellulose c) has a viscosity of from 2.4 to 1000 mPa·s, determined in a 2% by weight solution in water at 20° C.

7. The composition of claim 1 wherein the total amount of the hydroxypropyl methylcelluloses b) and c) is from 1.0 to 7.0 parts by weight, based on 100 parts by weight of the gluten-free flour.

8. The composition of claim 7 wherein the total amount of the hydroxypropyl methylcelluloses b) and c) is from 1.5 to 5.0 parts by weight, based on 100 parts by weight of the gluten-free flour.

9. The composition of claim 8 comprising, based on 100 parts by weight of the gluten-free flour,
from 0.8 to 2.4 parts by weight of the hydroxypropyl methylcellulose b) having a methoxyl content of from 19 to 24 percent and a hydroxypropoxyl content of from 7 to 12 percent and having a viscosity of 2000 to 20,000 mPa·s, determined in a 2% by weight solution in water at 20° C., and
from 0.8 to 2.4 parts by weight of the hydroxypropyl methylcellulose c) having a methoxyl content of from 28 to 30 percent and a hydroxypropoxyl content of from 7 to 12 percent and having a viscosity of 5 to 50 mPa·s, determined in a 2% by weight solution in water at 20° C.

10. The composition of claim 8 comprising, based on 100 parts by weight of the gluten-free flour,
from 0.8 to 2.4 parts by weight of the hydroxypropyl methylcellulose b) having a methoxyl content of from 19 to 24 percent and a hydroxypropoxyl content of from 7 to 12 percent and having a viscosity of 2000 to 20,000 mPa·s, determined in a 2% by weight solution in water at 20° C., and
from 0.8 to 2.4 parts by weight of the hydroxypropyl methylcellulose c) having a methoxyl content of from 27 to 30 percent and a hydroxypropoxyl content of from 4 to 7.5 percent and having a viscosity of 10 to 100 mPa·s, determined in a 2% by weight solution in water at 20° C.

11. The composition of claim 1 comprising at least three gluten-free flours selected from the group consisting of tapioca starch, rice flour, maize flour, potato starch, power produced from bamboo fibers and psyllium husk powder.

12. The composition of claim 1 additionally comprising water and being in the form of a dough or batter.

13. A gluten-free bakery product comprising or made from the gluten-free composition of claim 1.

14. The gluten-free bakery product of claim 13 being selected from the group consisting of gluten-free breads, gluten-free muffins, gluten- free cakes, gluten-free cookies, and gluten-free pizza crusts.

15. A method of managing a gluten-related disorder in an individual, comprising providing a food product comprising the gluten-free composition of claim 1 to the individual.

16. The composition of claim 1 comprising from 20 to 80 weight percent of the hydroxypropyl methylcellulose b) and from 80 to 20 weight percent of the hydroxypropyl methylcellulose c), based on the total weight of b) and c).

* * * * *